US005179400A

United States Patent [19]

Maeng

[11] Patent Number: 5,179,400

[45] Date of Patent: Jan. 12, 1993

[54] LIGHT SOURCE ASSEMBLY FOR USE IN LIGHT EXPOSING DEVICE OF COLOR CATHODE-RAY TUBE

[75] Inventor: Kwang-jae Maeng, Kyunggi, Rep. of Korea

[73] Assignee: 501 Samsung Electron Devices Co., Ltd., Kyunggi, Rep. of Korea

[21] Appl. No.: 771,515

[22] Filed: Oct. 2, 1991

Related U.S. Application Data

[63] Continuation of Ser. No. 435,044, Nov. 13, 1989, abandoned.

[30] Foreign Application Priority Data

Nov. 12, 1988 [KR] Rep. of Korea .............. 88-18496[U]

[51] Int. Cl.[5] .............................................. G03B 41/00

[52] U.S. Cl. ........................................................ 354/1

[58] Field of Search ............................................ 354/1

[56] References Cited

U.S. PATENT DOCUMENTS

| | | | |
|---|---|---|---|
| 2,439,330 | 4/1948 | Zander | 362/321 |
| 2,553,622 | 5/1951 | Zander | 362/321 |
| 2,735,929 | 2/1956 | Erhardt et al. | 362/321 |
| 4,811,182 | 3/1989 | Solomon | 362/321 |
| 4,866,466 | 9/1989 | van der Waal | 354/1 |

*Primary Examiner*—Michael L. Gellner
*Assistant Examiner*—David M. Gray
*Attorney, Agent, or Firm*—Morgan & Finnegan

[57] ABSTRACT

A light source assembly for use in a light exposing device of a color cathode ray tube is disclosed. The device comprises a cabinet having a mount for mounting the panel of a color cathode ray tube, a light source assembly, a light correcting means and a shutter means, the light source assembly, the light correcting means the shutter means being installed inside of the housing. Included with the light source assembly is a light pass amount adjusting mechanism capable of blocking and controlling, in a stepwise or non-stepwise manner, the light from a light exposing lamp. The adjusting mechanism is preferably provided at the front of the body of the assembly. The light amount from the light source assembly is variable, and therefore, the necessity of changing mechanisms which was required in conventional devices for light-exposing the panels of different kinds of cathode ray tubes is eliminated.

2 Claims, 2 Drawing Sheets

LIGHT SOURCE ASSEMBLY FOR USE IN LIGHT EXPOSING DEVICE OF COLOR CATHODE-RAY TUBE

This is a continuation of co-pending application Ser. No. 435,044, filed on Nov. 13, 1989, now abandoned.

FIELD OF THE INVENTION

The present invention relates to a light source assembly for the light exposing device of a color cathode ray tube. More particularly, the invention relates to an improved structure in which the amount of exposing light can be adjusted.

BACKGROUND OF THE INVENTION

A conventional light exposing device is schematically illustrated in FIG. 1. In the device of FIG. 1, a light source assembly 20' is disposed at the bottom of a cabinet 10. A mount 11, mounting a panel 60, is provided at the upper position of the cabinet 10. A correcting filter 13 and a correcting lens 12, for correcting the light radiated from the light source assembly, are disposed between the light source assembly body 20' and the panel 60.

Additionally, a shutter (not shown) is provided, between the correcting lens and filter 12, 13 and the bottom of the panel, for partially passing the light radiated from the light source assembly 20'.

The light source assembly 20' generally takes a form which is the same as or similar to that illustrated in FIG. 2. That is, a light exposing lamp 21' is installed in such a manner as to be exposed to a cavity 23' formed at the center of the body of a cooling tank 22'. A protecting glass 24' may be installed in the middle cavity 23'.

The amount and path of the outgoing light radiated from such a light source assembly may be properly corrected by passing it through the correcting lens and filter, so that the fluorescent stripe on the inner face of the panel should be formed in a uniform manner.

However, there is a limit in the correcting function of the correcting lens and filter. Therefore, in the case of large cathode ray tubes and the like, the light amount exposed on the peripheral areas of the screen may be significantly insufficient relative to the middle area of the screen, resulting in the widths of the fluorescent stripes being non-uniform. This in turn causes an increase in the difference of the luminances in some parts of the screen, thereby lowering the image quality. That is, in the case of a large screen, the difference of the light exposing amounts between the peripheral areas and the middle area of the screen becomes large, giving rise to the above described problems. Increasing the light exposing amount radiated to the peripheral areas of the screen is required to solve the above described problem.

SUMMARY OF THE INVENTION

Therefore, it is an object of the present invention to provide a light source assembly for use in a light exposing device of a color cathode ray tube, in which fluorescent dots on the panel of the color cathode ray tube are formed in a uniform manner to improve image quality.

In achieving this and other objects of the invention, a light source assembly for use in a light exposing device of a color cathode ray tube according to the present invention comprises a body with a cavity formed at its center, a light exposing lamp installed in such a manner as to be exposed to the cavity and a light pass amount adjusting mechanism capable of blocking and controlling in a stepwise or non-stepwise manner the light from the light exposing lamp. Preferably, the light pass amount adjusting mechanism may be configured like a diaphragm and may be provided adjacent the cavity at the front of the body.

BRIEF DESCRIPTION OF THE DRAWINGS

The above objects and other advantages of the present invention will become more apparent by describing in detail the preferred embodiment of the present invention with reference to the attached drawings in which.

DESCRIPTION OF THE PREFERRED EMBODIMENT

Figure 1:
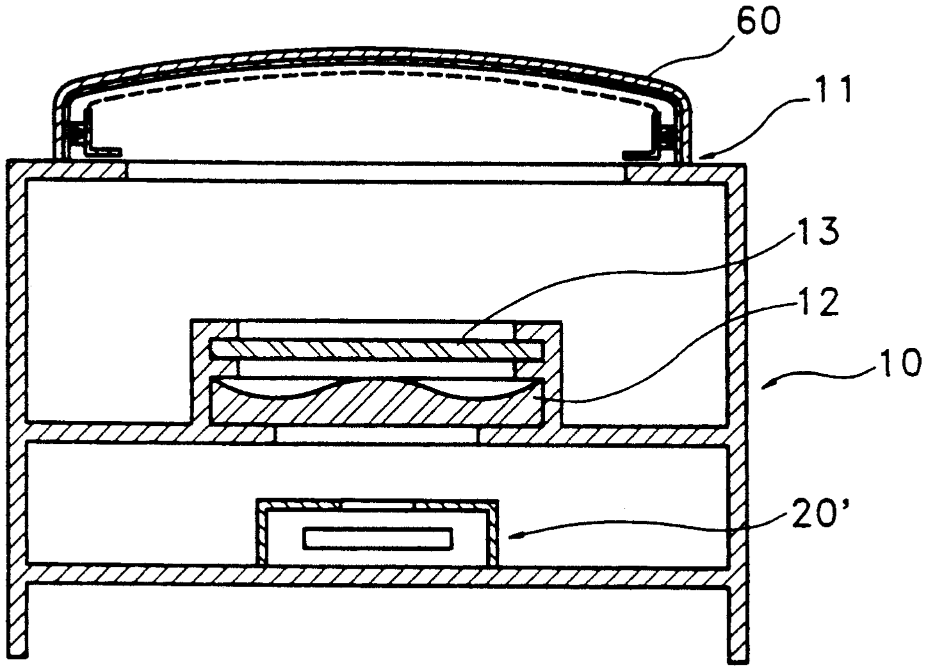
FIG. 1 (PRIOR ART)
FIG. 1 is a schematical sectional view of a conventional light exposing device of a color cathode ray tube.
Figure 2:
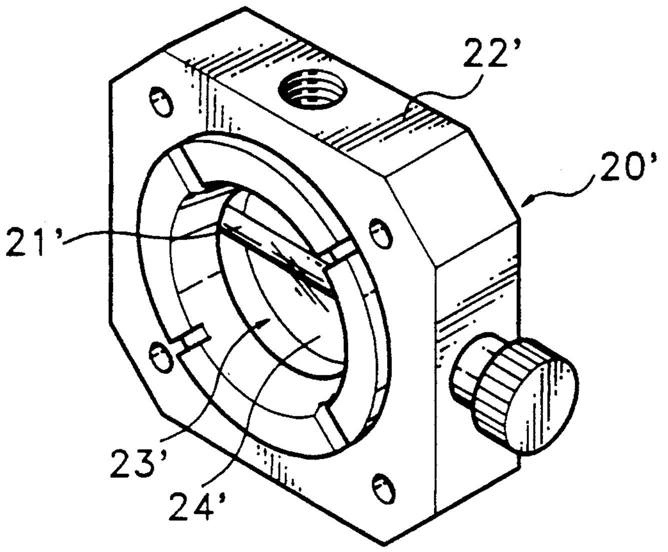
FIG. 2 (PRIOR ART)
FIG. 2 is a perspective view of a conventional light source assembly.
Figure 3:
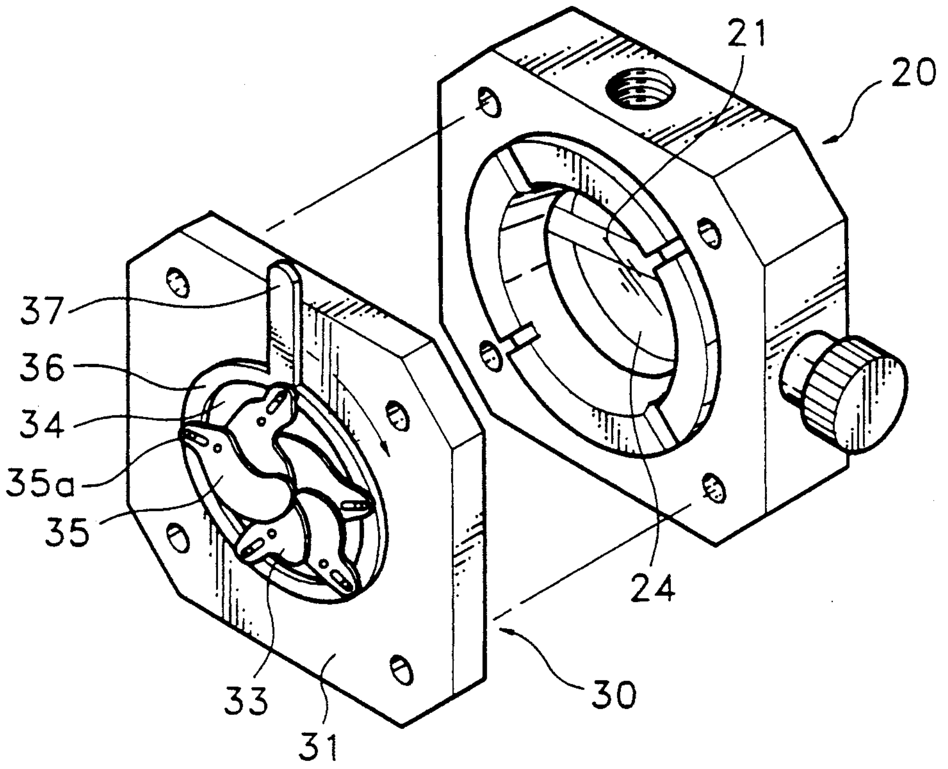
FIG. 3 is an exploded perspective view of a light source assembly according to the present invention.

As shown in FIG. 3, a diaphragm block 30 is coupled with the front face of a light source assembly body 20. The light source assembly may have essentially the conventional structure described above by way of reference to FIG. 2. A through hole 33 is formed at the center of the body of a block base 31 of the diaphragm block 30 in such a manner that the hole 33 should matingly face a cavity 24 of the light source assembly 20. Around the through hole 33, an annular projection 34 is formed to which sectors 35 to be described later are pin-coupled. A ring 36 having a lever 37 is coupled with the circumference of the annular projection 34.

A plurality of sectors 35 are pin-coupled with the annular projection 34 of the block base 31. Slots 35*a* are formed near the outer end of the sectors 35 for coupling with the ring 36.

Thus, a light pass amount adjusting mechanism in accordance with the invention, which includes sections 35, the diaphragm block 30 and the ring 36, may have a shape similar to the diaphragm of a camera. With such a device it becomes possible to adjust the light amount radiated from the light exposing lamp 21 of the light source assembly 20 by rotating the lever 37 of the ring 36.

Figure 4A:
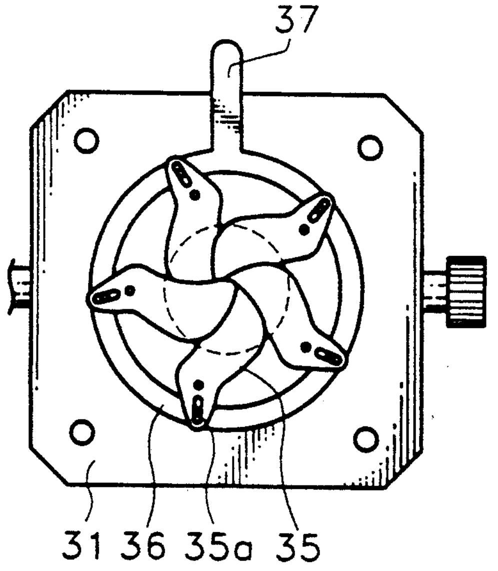
FIG. 4A is a frontal view of a device according to the present invention which shows a state with the diaphragm completely closed.
Figure 4B:
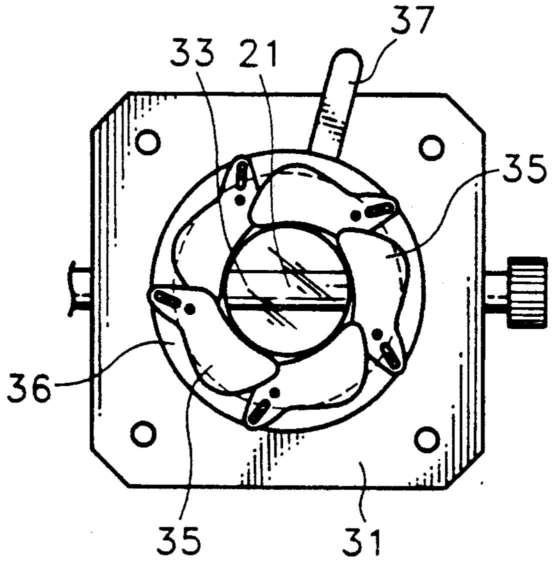
FIG. 4B is a frontal view of a device according to the present invention which shows a state with the diaphragm completely open.

According to the preferred embodiment of the invention, the degree of the opening of the through hole 33 can be adjusted by means of a plurality of sectors 35 interlocked with the lever 37, the adjustment being carried out by properly shifting the position of the lever 37 as shown in FIGS. 4A and 4B. That is, as shown in FIG. 4A, the through hole 33 can be completely closed. Alternatively, the through hole 33 can be completely opened as shown in FIG. 4B. Further, although it is not illustrated in the drawings, the opening degree of the through hole can be properly increased or decreased incrementally between the fully opened and fully closed positions by shifting the position of the lever.

According to the invention, when exposing to light different kinds of panels, e.g., different kinds of cathode ray tubes requiring variation in the amount of light radiated from the above mentioned light source assembly, the adjustment of the light amount via electrical control or the replacement of the above-mentioned light source assembly becomes unnecessary, in contrast to conventional methods and apparatus.

Further, the lever 37 can be desirably interlocked with the shutter of the light exposing device, so that, when the slit of the shutter is directed toward the peripheral area of the screen, that is, when the light from the light source assembly is radiated onto the peripheral stripes of the screen, the opening degree can be increased so that the amount of the exposing light can be increased. Similarly, when the light exposure is directed toward the middle stripe of the screen, the opening degree can be decreased by contracting the diaphragm, causing the proper amount of light to be passed.

According to the present invention, the amount of light from the light source assembly is variable. Therefore the changing of mechanisms which was conventionally required in light-exposing panels of different kinds of cathode ray tubes in the prior art becomes unnecessary with the invention. Such advantages particularly result from the invention's capability to adjust the light amount depending on the position of the screen (e.g., a peripheral area or a middle area), such that the widths of the fluorescent stripes formed on the inner face of the panel can become uniform, thereby improving the image quality of the cathode ray tube.

Although the invention has been described in detail by way of reference to the preferred embodiments of the invention, it should be understood that the invention is not limited to the embodiments described herein, but should be interpreted only by way of reference to the claims which follow.

What is claimed is:

1. A light source assembly for use in light exposing device of a color cathode-ray tube, comprising:

a body having a cavity formed at the center thereof;

a light exposing lamp installed in such a manner as to be exposed to said cavity;

light adjusting means provided at the front of said body capable of blocking and controlling in a stepwise or non-stepwise manner the light radiated from said light exposing lamp; and means for light correction including a correcting lens and a correcting filter.

2. A light source assembly for use in a light exposing device as recited in claim 1, wherein said adjusting means further includes:

a block base having a through hole matingly facing said cavity;

a plurality of sectors pin-coupled about the circumference of said through hole and capable of closing and opening said through hole; and a ring pin-coupled and interlocked with said plurality of said sectors.

* * * * *